United States Patent Office 2,816,930
Patented Dec. 17, 1957

2,816,930
ARALKYL CARBINOLS

Joseph A. Lambrech, Charleston, W. Va., assignor to Union Carbide Corporation, a corporation of New York No Drawing. Application September 30, 1954, Serial No. 459,507

3 Claims. (Cl. 260—592)

This invention relates to new chemical compounds and to a method for their manufacture. More particularly, the present invention relates to certain aralkyl carbinols and to a process for their preparation.

The compounds to which the present invention relates can be represented by the general formula:

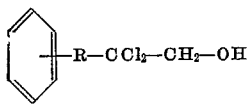

wherein R is a member selected from the class consisting of (—CO—) and (—HCOH—) groups. The members of this class of compounds are alpha, alpha-dichloro-alpha-hydroxymethyl-acetophenone and its functional derivative, 2,2-dichloro-3-phenyl-1,3-propanediol.

The compounds of this invention can be reacted with formaldehyde to form useful resins. They can also be esterified to produce compounds of value as plasticizers for synthetic resins. They are of particular value as dye carriers for synthetic fibers, particularly polyethylene-terephthalate.

Alpha, alpha-dichloro-alpha-hydroxymethylacetophenone can be prepared by condensing approximately equimolar amounts of formaldehyde and alpha, alpha-dichloroacetophenone. The condensation reaction can be represented graphically by the following equation:

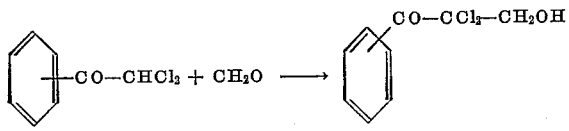

The condensation can be conducted in the presence of from about 1 weight percent to about 3 weight percent (based on the weight of the reactants) of an alkaline catalyst, such as an alkali metal hydroxide, an alkaline earth metal hydroxide or a tertiary amine, at a temperature of from about 0° C. to about 40° C. and preferably at about 20° C. for a period of from about 2 hours to about 24 hours. After the reaction is complete, from about 1 to about 3 volumes of water are added to the reaction mixture, whereby oil and water layers are formed. The oil layer is separated from the water layer and distilled to yield the desired product. The alpha, alpha-dichloro-acetophenone is readily prepared by the known reaction of chlorine with acetophenone.

2,3-dichloro-3-phenyl-1,3-propanediol can be prepared by reducing alpha, alpha-dichloro-alpha-hydroxy-methyl-acetophenone. The reduction reaction can be conducted by reacting the ketalcohol with an excess of an alcohol, such as isopropanol, in the presence of a catalytic amount of an aluminum alcoholate, such as aluminum isopropoxide, at a temperature corresponding to the boiling point of the alcohol until the ketone produced by the reaction is no longer distilled from the reaction mixture. The reduction reaction can be graphically represented by the equation:

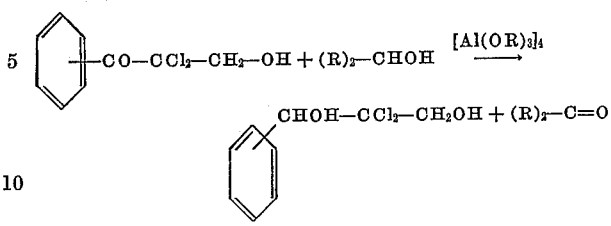

wherein R is an alkyl group.

The following examples are illustrative:

Example I

Alpha, alpha-dichloro-alpha-hydroxymethylacetophenone was prepared by slowly adding a methanolic solution of sodium hydroxide (12 grams of sodium hydroxide in 150 cc. water and 300 cc. methanol) to a mixture of 567 grams of dichloro acetophenone and 255 grams of 40 percent formalin at 20° C. The reaction mixture was maintained at 20° C. for 24 hours and then added to 2 liters of water. The oil layer which formed was separated from the water and distilled. This product boils at 134° C. at 5 mm. and has a specific gravity of 1.367 (20°/20° C.). The yield was 90 percent. This product is soluble in alcohols and ketones.

Example II 2,2-dichloro-3-phenyl-1,3-propanediol was prepared by adding 300 grams of alpha, alpha-dichloro-alpha-hydroxymethylacetophenone to a mixture of 65 grams of aluminum isopropoxide and 1000 cc. of isopropanol at the boiling point (70° C. to 85° C.). Heating was continued until acetone no longer distilled from the mixture. The isopropanol was removed by distillation and the catalyst neutralized with dilute sulfuric acid. The residue solidified. It was recrystallized from benzene. It is a white crystalline solid which melts at 107° C. and is soluble in alcohols and ketones.

I claim:

1. A compound having the formula:

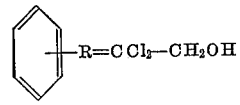

wherein R is a member selected from the class consisting of —CO— and —HCOH— groups.

2. Alpha, alpha-dichloro-alpha-hydroxymethylacetophenone, having the formula:

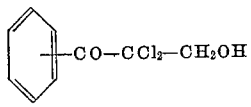

3. 2,2-dichloro-3-phenyl-1,3-propanediol, having the formula:

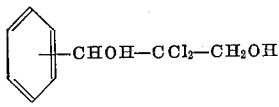

References Cited in the file of this patent

UNITED STATES PATENTS 2,330,179    Morey _____ Sept. 21, 1943

OTHER REFERENCES

Carrara et al.: Chem. Abstracts, vol. 46, pp. 3982–3983.
Wagner et al.: Synthetic Organic Chemistry, New York, Wiley & Sons, Inc., 1953, p. 152.

UNITED STATES PATENT OFFICE
Certificate of Correction

December 17, 1957

Patent No. 2,816,930      Joseph A. Lambrech

It is hereby certified that error appears in the printed specification of the above numbered patent requiring correction and that the said Letters Patent should read as corrected below.

Column 1, line 66, for "ketalcohol" read —ketoalcohol—; column 2, lines 44 to 47, claim 1, the formula should appear as shown below instead of as in the patent—

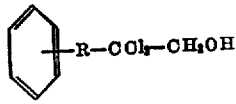

Signed and sealed this 18th day of February 1958.

[SEAL]

Attest:
KARL H. AXLINE,
*Attesting Officer.*

ROBERT C. WATSON,
*Commissioner of Patents.*